(12) United States Patent
Buellesbach

(10) Patent No.: US 8,142,873 B2
(45) Date of Patent: Mar. 27, 2012

(54) ROD FOR SUPPORTING COMPONENTS IN A FUSELAGE CELL STRUCTURE OF AN AIRCRAFT

(75) Inventor: Tim Buellesbach, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 13/021,383

(22) Filed: Feb. 4, 2011

(65) Prior Publication Data

US 2011/0212291 A1 Sep. 1, 2011

Related U.S. Application Data

(63) Continuation of application No. PCT/EP2009/061060, filed on Aug. 27, 2009.

(60) Provisional application No. 61/191,879, filed on Sep. 12, 2008.

(30) Foreign Application Priority Data

Sep. 12, 2008 (DE) .................. 10 2008 042 036

(51) Int. Cl.
*B64C 1/00* (2006.01)

(52) U.S. Cl. ....... 428/99; 428/373; 428/318.4; 428/116; 244/119; 244/129.1; 244/133

(58) Field of Classification Search ............... 428/36.5, 428/373, 318.4, 99, 116; 244/133, 129.1, 244/131; 52/831

See application file for complete search history.

(56) References Cited

U.S. PATENT DOCUMENTS 6,889,744 B2 5/2005 Keetman et al.
2010/0044510 A1 2/2010 Schroeer et al.

FOREIGN PATENT DOCUMENTS

| DE | 10057566 A1 | 5/2002 |
|---|---|---|
| DE | 102006019123 A1 | 10/2007 |
| EP | 1090697 A2 | 4/2001 |
| EP | 1120340 A2 | 8/2001 |
| EP | 1319453 A1 | 6/2003 |

OTHER PUBLICATIONS

International Search Report / Written Opinion for PCT/EP2009/061060 dated May 11, 2010.

*Primary Examiner* — Alexander Thomas
(74) *Attorney, Agent, or Firm* — Jenkins, Wilson, Taylor & Hunt, P.A.

(57) ABSTRACT

A rod for supporting components in a fuselage cell structure, in particular produced with fibre-reinforced composite materials, of an aircraft, in particular for supporting at least one floor frame on at least one annular former and/or at least one further component of the fuselage cell structure.

In accordance with the invention the rod is formed, at least in portions, with a metal foam, in particular for the absorption of crash loads.

The metal foam can transform, irrespective of its inherent weight, the high mechanical loads produced in the event of an accident into work of plastic deformation at the microcavities within the metal foam.

A first variant of the rod is almost completely formed by a metal foam, whereas a second embodiment comprises merely a core made of the metal foam with a relatively small diameter, which core is surrounded coaxially by a support casing and an outer sleeve.

8 Claims, 2 Drawing Sheets

ROD FOR SUPPORTING COMPONENTS IN A FUSELAGE CELL STRUCTURE OF AN AIRCRAFT

CROSS-REFERENCE TO RELATED APPLICATIONS

This application is a continuation of PCT/EP2009/061060 filed Aug. 27, 2009 and claims the benefit of U.S. Provisional Application No. 61/191,879, filed Sep. 12, 2008 and German Patent Application No. 10 2008 042 036.0, filed Sep. 12, 2008, the entire disclosures of which are herein incorporated by reference.

FIELD OF THE INVENTION

The invention relates to a rod for supporting components in a fuselage cell structure, in particular produced with fibre-reinforced composite materials, of an aircraft, in particular for supporting at least one floor frame on at least one annular former and/or at least one further component in the fuselage cell structure.

At least one floor frame is generally integrated into a fuselage cell structure of a passenger aircraft and is formed, inter alia, by a large number of transverse crossbars arranged successively and extending transverse to the direction of flight, as well as with seat rail profiled parts fixed to said transverse crossbars in the longitudinal direction of the fuselage cell structure. A hold with a hold floor extending at a short distance from the so-called 'bilge' of the fuselage cell is generally disposed beneath the floor frame. The floor frame and transverse crossbars are supported by suitable supporting rods, for example on the annular formers in the fuselage cell structure.

Modern aircraft are increasingly produced using composite materials, in particular using carbon fibre reinforced thermosetting synthetic resins, above all for reasons of weight reduction. In some cases all of the basic components of the fuselage cell structure of aircraft, in particular the skin segments and outer skin, annular formers, transverse crossbars and stringers including all connecting brackets, are already produced using CFRP materials nowadays.

The weight reduction also reduces maintenance costs as a result of the use of such composite materials since, in particular, the effects of corrosion only slightly affect the structure if a suitable material composition is used.

However, a drawback is the increased repair cost of known CFRP components. Open repair is virtually impossible in the event of mechanical damage caused by the impact of stones or the like. In addition, it is difficult to detect cracks and/or delaminations in CFRP components since these defects often start within the material and, in the early stages, can only be detected on the surface with difficulty.

As a result of the considerably reduced electrical conductivity compared to metal materials, a CFRP fuselage cell structure can also no longer be used as a common return conductor or as a body for the entire aircraft electrics, and therefore additional electrical return lines are to be provided.

A further drawback is that modern CFRP materials are only slightly resiliently deformable as a result of their extremely high level of mechanical rigidity, so the mechanical peak loads ('crash loads') which occur in the event of an accident, which are short in duration but are nevertheless very strong, cannot be sufficiently reduced. In such critical situations, known CFRP materials tend to be increasingly likely to splinter or break completely once the mechanical limit load has been reached. In some cases the crash loads may even be increased as a result of the spring action of the CFRP materials.

Known embodiments of supporting rods and wing supports are generally formed by extruded profiles which are produced with a metal material, in particular with a high-strength aluminium alloy. Inter alia, supporting rods of this type support the floor frame on the annular formers in a fuselage cell structure of an aircraft. In many cases these supporting rods are configured to be adjustable in length so as to make it possible to compensate for any tolerance and generally comprise at either end a metal fitting, with which it is possible to mechanically join in an articulated manner the parts to be connected, for example an annular former and a transverse crossbar. The supporting rods exhibit advantageous crash properties as a result of the use of preferably metal materials for their production since the rods, as a result of an inherent plastic deformation, are able to absorb a relatively large amount of the mechanical energy produced in the event of an accident involving an aircraft, and therefore render the situation harmless to the passengers. Compared to the conventional components of a CFRP fuselage cell, however, such supporting rods made of extruded aluminium alloys are relatively heavy.

A device for improving the crash properties of an aircraft, in particular a helicopter, is known from EP 1 120 340 A2. A cuboid tank is disposed beneath the floor and is filled with an open-cell foam material which is impregnated, at least in part with fuel. In the event of an accident, for example in the event of a very rough landing or a crash, the tank is compressed and the fuel is forced to flow through the foam material. A greater amount of the impact energy is absorbed as a result of the viscous flow in conjunction with the deformation of the foam material caused by the impact. However, a drawback of this variant is the weight, since an additional absorption element for absorbing the impact energy is included but does not take up any stresses within the fuselage cell during normal operation.

As a result of the drawbacks illustrated above of known embodiments of supporting rods for reinforcing fuselage cell structures, these rods are therefore only suitable for use in fuselage cells produced using CFRP materials.

SUMMARY OF THE INVENTION

The object of the invention is therefore to provide a supporting rod which is significantly lighter than known embodiments, but which is able to considerably reduce, as a result of plastic deformation, the high peak crash loads and accident loads of an aircraft which occur in the event of an aircraft accident.

This object is achieved by a rod having the characterizing features of a core formed with a metal foam for the absorption of crash loads, a support casing formed with a plastics material and surrounding the core coaxially, and an outer sleeve formed with a fibre-reinforced plastics material and surrounding the support casing coaxially, wherein the support casing is configured in such a way that it ensures a defined spatial position of the core.

Since the rod is formed at least in portions by a metal foam, in particular for the absorption of crash loads, the rod according to the invention is considerably lighter than conventional supporting rods, the capacity for absorbing of high mechanical peak loads in the event of an aircraft accident also being improved compared to supporting rods made of a solid, extruded metal material.

The foams required for producing rods according to the invention are produced using known methods.

In an advantageous configuration of the rod the metal foam is formed by a metal alloy. The use of aluminium alloys for the metal foam used makes it possible to achieve an additional weight reduction as a result of the lightweight aluminium alloy material alongside the desired reduction in weight obtained by the cavities integrated into the metal matrix of the metal foam. Furthermore, in terms of manufacture, aluminium alloy materials can be rather easily foamed owing to their relatively low melting point of approximately 700 ° C., so cost-effective production is possible.

In accordance with a further advantageous configuration it is provided for the rod to be formed completely by the metal foam.

In terms of manufacture a particularly simple and cost-effective construction of the rod is thus achieved. Furthermore, the end metal fittings can be fastened more easily to a solid metal foam cylinder.

In accordance with a further development an outer face of the rod is closed-cell or open-cell. In particular the closed-cell variant affords the advantage that moisture and/or particles of dirt cannot infiltrate the rod, in such a way that corrosive effects can be eliminated, in particular for aluminium alloys, whilst in the open-pore or open-cell embodiment the aforementioned effects cannot be entirely prevented, but a drainage capability is provided in the region of the rod close to the surface for any foreign materials that have already infiltrated.

In accordance with a further advantageous configuration the rod comprises a core which is formed, at least in portions, by the metal foam, the core being covered, at least in portions, by at least one support casing and/or by at least one outer sleeve and, in particular, being surrounded coaxially.

As a result of this configuration it is possible for the normal stresses occurring during flight operation to be substantially absorbed by the support casing and also additionally by the outer sleeve, whilst the high mechanical peak loads which occur in a crash situation are eliminated almost exclusively by a plastic deformation of the metal foam core. Furthermore, uncontrolled buckling of the metal foam core in the event of a crash is prevented by the support casing in such a way that the kinetic energy is absorbed almost exclusively by the compression of the cavities contained in the metal foam and the energy is absorbed almost exclusively in a longitudinal direction of the rod. In addition, the infiltration of moisture and/or foreign particles into the metal foam core is prevented by the outer sleeve in such a way that undesired effects of corrosion, which may be detrimental to mechanical strength and/or the ability to absorb kinetic energy, are eliminated.

Further advantageous configurations of the rod are described in the further claims.

DESCRIPTION OF EXEMPLARY EMBODIMENTS

Figure 1:
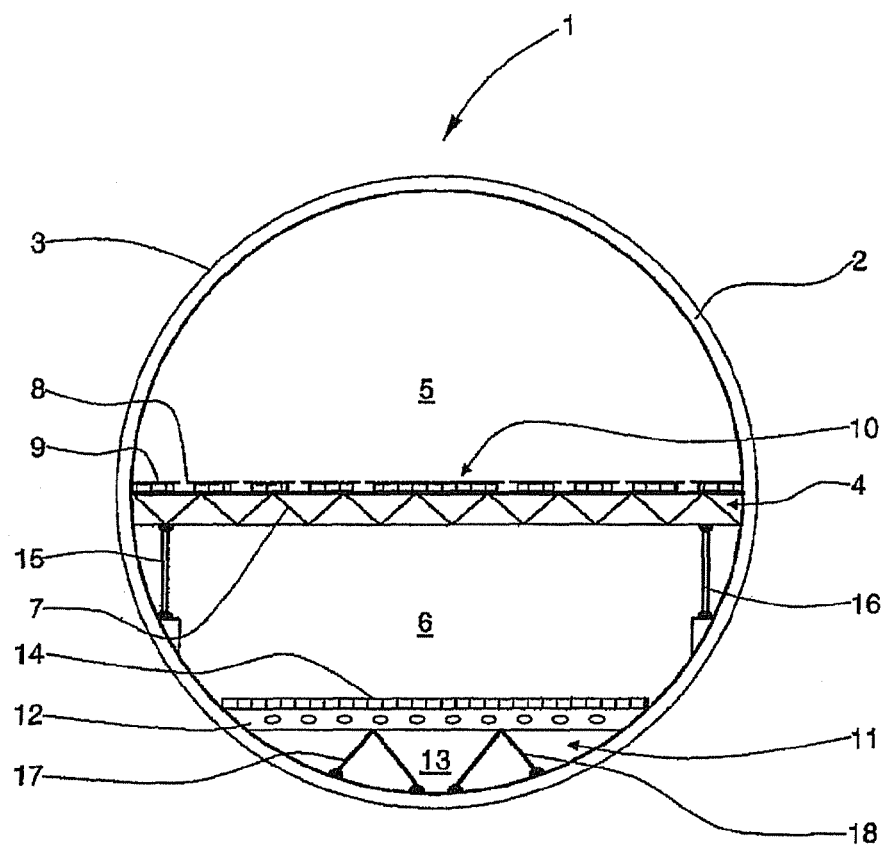
FIG. 1 is a schematic cross-sectional view of the construction of a fuselage cell structure of an aircraft.

FIG. 1 is a cross-sectional view through a fuselage cell structure of an aircraft. A fuselage cell structure 1 of an aircraft comprises a large number of annular formers, of which one annular former 2 is provided with a reference numeral. The fuselage cell structure 1 is completely covered by an outer skin 3 or outer skin segments. The fuselage cell structure 1 further comprises a floor frame 4 which divides the fuselage cell structure 1 into a passenger cabin 5 and a generally smaller hold 6 arranged therebelow. The floor frame 4 is constructed with a large number of crossbars 7 which are each arranged in a plane transverse to the longitudinal direction of the aircraft, spaced approximately uniformly from one another and successively. On the crossbar 7 a seat rail 8 extends perpendicular to the drawing plane, i.e. parallel to the longitudinal axis of the aircraft, and parallel to a large number of further seat rails which, on the one hand, reinforce the floor frame 4 and, on the other, fasten groups of passenger seats. Floor plates 9 are arranged between the seat rail profiled parts and form an accessible floor area 10.

The fuselage cell structure 1 also comprises a hold frame 11 which is formed by a large number of crossbars 12, similarly to the floor frame 4. The so-called 'bilge' 13, i.e. the lowest region inside the fuselage cell structure 1, is disposed beneath the hold frame 11. A hold base 14 formed by a large number of base plates lies on the crossbars of the hold frame 11. On the one hand the crossbars 7, 12 are each connected in the region of either end to the annular former 2. In addition the crossbar 7 of the floor frame 4 is supported on the annular former 2 via two rods 15, 16 according to the invention arranged at either end, whilst the hold frame 11 is supported on the annular former 2, inter alia, by the two outer rods 17, 18 (also configured in accordance with the invention). All further crossbars of the floor frame 4 and of the hold frame 11 are thus supported on the annular former by rods. All rods configured in accordance with the invention have metal fittings (not provided with a reference numeral) in order to provide a connection to the crossbars and annular formers, which connection is generally articulated at least unilaterally. The metal fittings are merely indicated by black semi-circles in the illustration of FIG. 1.

Figure 2:
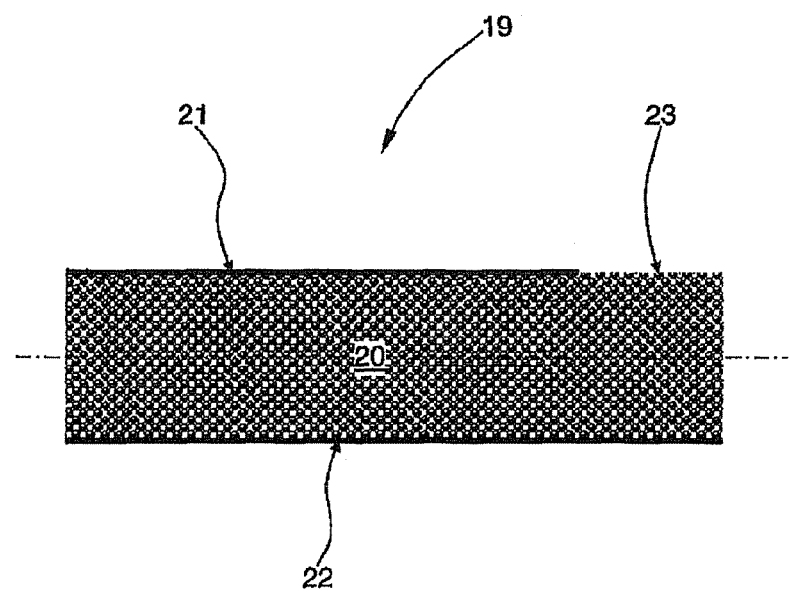
FIG. 2 is a cross-sectional view of a central portion of a first variant of a rod.

FIG. 2 shows a highly schematic cross-sectional view of a (central) portion of a first variant of a rod according to the invention. A rod 19 is formed completely by a metal foam 20 and is approximately cylindrical. An outer face 21 of the cylindrical rod 19 has a smooth surface in a first region 22, i.e. the pores or microscopic cavities of the metal foam 20 are closed in this region and form a continuous plane. In contrast, a second region 23 of the outer face 21 has a rough surface which is obtained by open pores of the metal foam 20 in this region, at least on the outer region. The outer face 21 is thus closed-pore in the first region 22, whilst the second region 23 is open-pore. The rod 19 will generally have a completely closed-pore or completely open-pore outer face.

The metal foam 20 is formed by foaming an aluminium alloy by means of a conventional foaming method. Alternatively, hollow aluminium balls are formed in a first production step and are baked to form a one-piece metal foam, for example by sintering, in a second method step.

Figure 3:
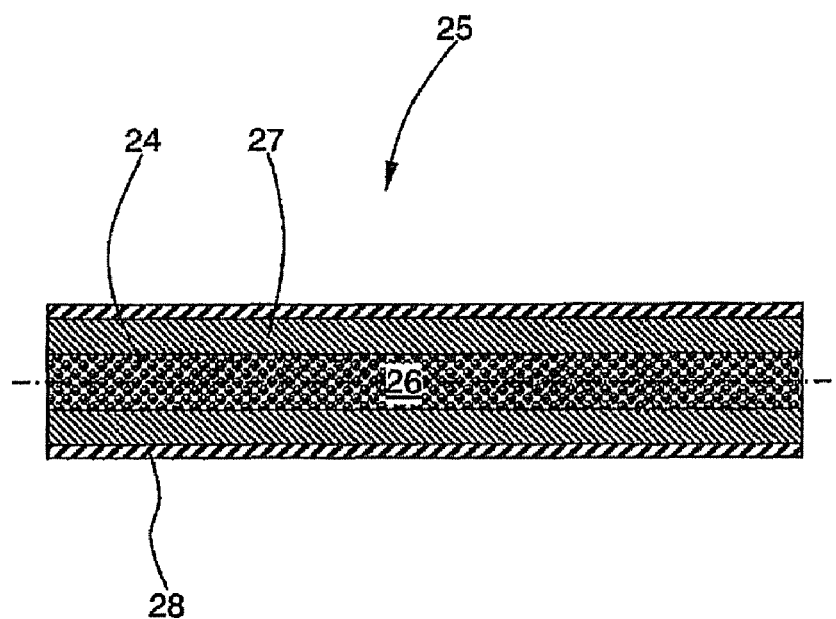
FIG. 3 is a cross-sectional view through a second variant of a rod.

FIG. 3 shows a schematic cross-sectional view of a (central) portion of an alternative embodiment of a rod, formed by a metal foam, for absorbing elevated mechanical crash loads in the event of an accident involving an aircraft.

A preferably cylindrical core 24 of a rod 25 is formed completely by a metal foam 26. The core 24 is surrounded coaxially by a hollow cylindrical support casing 27 which is in turn surrounded concentrically by a hollow cylindrical outer sleeve 28. The metal foam 26 consists completely of a foamed aluminium alloy, whilst the support casing is formed by a plastics foam, in particular a rigid foam or a core structure, for example a rolled-up honeycomb core of low material thickness. A folded honeycomb core capable of drainage may also be used instead of a honeycomb core with a large number of adjoining, closed hexagonal honeycomb cells. The outer sleeve 28 is preferably formed by a fibre-reinforced, thermosetting plastics material, in particular by a carbon fibre reinforced epoxy resin or a glass fibre reinforced polyester resin. Alternatively, the outer sleeve 28 may also consist of an aluminium alloy.

Inter alia, a defined spatial position of the core 24 is ensured by the support casing 27 in such a way that, for example, uncontrolled lateral buckling of the core 24 is prevented in the event of a crash and a maximum amount of the kinetic deceleration energy produced flows into a plastic deformation along a longitudinal axis of the core 24. On the one hand the outer sleeve 28 protects both the support casing 27 and the core 24 made of the metal foam 26 against harmful, i.e. in particular corrosive atmospheric influences, but on the other hand can also transfer, via the rod 25, at least some of the stresses occurring during normal operation of the aircraft.

The rods configured in accordance with the invention exhibit an excellent capacity for energy absorption in the event of a crash compared to the known embodiments of supporting rods and wing supports, and at the same time are significantly lighter.

LIST OF REFERENCE NUMERALS

| | |
|---|---|
| 1 | fuselage cell structure |
| 2 | annular former |
| 3 | outer skin |
| 4 | floor frame |
| 5 | passenger cabin |
| 6 | hold |
| 7 | crossbar (floor frame) |
| 8 | seat rails |
| 9 | floor plate |
| 10 | floor |
| 11 | hold frame |
| 12 | crossbar (hold frame) |
| 13 | bilge |
| 14 | hold floor |
| 15 | rod |
| 16 | rod } floor frame |
| 17 | rod } |
| 18 | rod } hold frame |
| 19 | rod |
| 20 | metal foam |
| 21 | outer face |
| 22 | first region (closed-pore) |
| 23 | second region (open-pore) |
| 24 | core |
| 25 | rod |
| 26 | metal foam |
| 27 | support casing |
| 28 | outer sleeve |

The invention claimed is:

1. A rod for supporting components in a fuselage cell structure of an aircraft, said rod comprising:
   a core formed with a metal foam for the absorption of crash loads;
   a support casing formed with a plastics material and surrounding the core coaxially; and
   an outer sleeve formed with a fibre-reinforced plastics material and surrounding the support casing coaxially,
   wherein the support casing is configured in such a way that it ensures a defined spatial position of the core.

2. The rod according to claim 1, wherein the metal foam is formed with an aluminium alloy.

3. The rod according to claim 1, wherein the support casing is formed with a plastics foam and/or a core structure.

4. The rod according to claim 3, wherein the support casing is formed with a honeycomb core.

5. The rod according to claim 1, wherein the outer sleeve is formed with a glass fibre reinforced or carbon fibre reinforced plastics material.

6. The rod according to claim 1, wherein the two ends of the rod are each provided with a metal fitting for connection to the fuselage cell structure.

7. The rod according to claim 6, wherein the metal fitting comprises an eye.

8. The rod according to claim 1, wherein the fuselage cell structure is produced with fibre-reinforced composite materials.

* * * * *